May 17, 1932.    M. D. B. STROECKER    1,858,691
FLASH LIGHT DEVICE
Filed Jan. 28, 1931    2 Sheets-Sheet 2

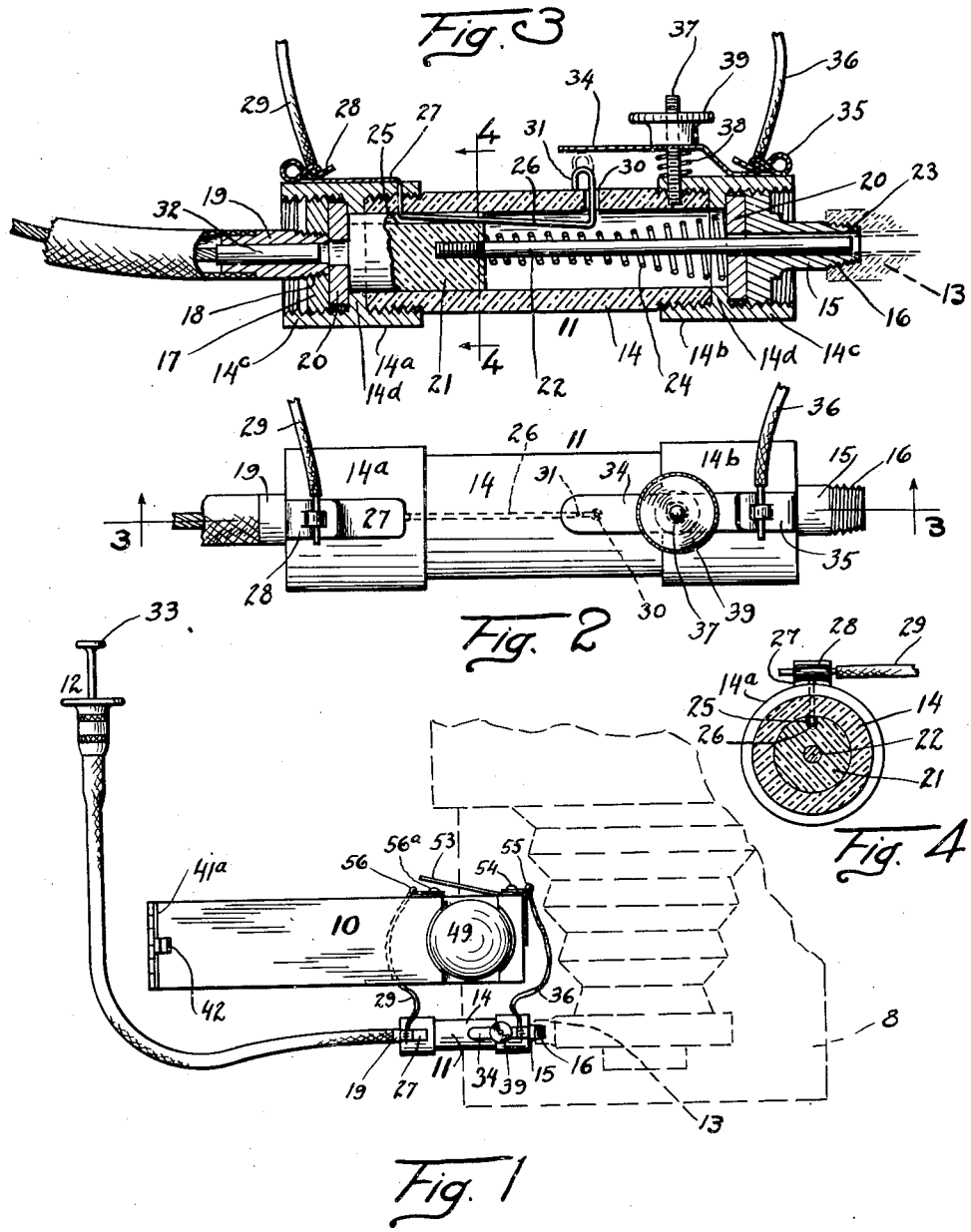

INVENTOR.
Monroe D. B. Stroecker
BY
ATTORNEY.

Patented May 17, 1932

1,858,691

UNITED STATES PATENT OFFICE

MONROE D. B. STROECKER, OF DETROIT, MICHIGAN

FLASH LIGHT DEVICE

Application filed January 28, 1931. Serial No. 511,778.

This invention relates to flashlight devices for operation in connection with photography and in particular to a device adapted to be connected directly to the shutter operating portion of a camera or to be used as an ordinary hand flash device in which synchronization of the shutter and flash are not needed.

I am aware that it has been common practice to construct so-called speed flash devices of many types, some using powder to produce light, and others using electricity to perform this function. The speed flash releases using powder as a means to produce light do not work out practically for the reason that in the first place there is a slight pause or interval between the time the release is operated and the time the powder ignites to cause the flashlight, and in the second place because there is no uniformity in such time interval which may vary for each flash powder or cartridge. Owing to the fact that the exposure, particularly with high grade cameras, is frequently made in but a small fractional part of a second, it is practically impossible to synchronize the powder ignition and the shutter actuating apparatus.

The principal object of the invention is to provide a new and improved construction for a flashlight device which is of a small compact size that can be readily attached to a camera and that will be practically instantaneous in its lighting effect so as to be practical for use as a part of the equipment of either the commercial, newspaper or amateur photographer and for use with the high speed shutters now so commonly employed in high grade photography.

Another object is to provide a new and improved construction of speed flash device which may be automatically operated to produce the intense actinic rays necessary in synchronism with the camera shutter that the exposition of the film will take place simultaneously with the flash.

Another object of my invention is to provide a flashlight device which may be used for the taking of flashlight pictures independently of the switching and shutter actuating apparatus.

A further object is to provide a small compact device for efficiently employing the newly developed photo-flash bulb for the taking of flashlight pictures.

Another object is to provide an apparatus in which a bulb of relatively small lighting effect may be employed in place of the photo-flash bulb for the focusing of the camera preparatory to the taking of a picture, and Another object is to provide a simple adjustment means whereby precise and exact synchronization between the shutter actuating mechanism and the flash bulb ignition means may be obtained.

The above and other objects of the invention will appear more fully from the following more detailed description and by reference to the accompanying drawings wherein a satisfactory constructional example has been disclosed merely as illustrative of the principles of the invention and not as limiting the scope thereof and wherein:

Fig. 1 is a plan view illustrating a camera with the speed flash release device mounted thereon ready for use.

Fig. 2 is a plan view of the cylinder which contains the actuating means for operating the speed flash device.

Fig. 3 is a longitudinal section taken on the line 3—3 of Fig. 2 of the cylinder showing in detail the actuating means for operating the speed flash device.

Fig. 4 is a cross section taken on the line 4—4 of Fig. 3.

Figure 5:
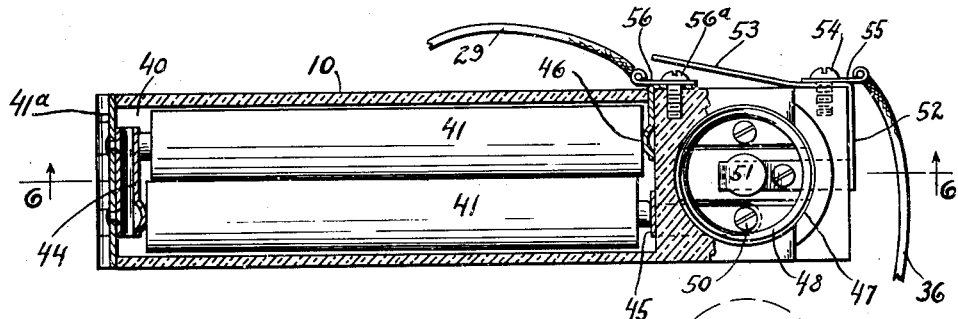
Fig. 5 is a plan view of the battery magazine and bulb socket unit device, with the top of said unit removed to show the batteries in position therein.

As shown in the drawings the numeral 8 (see Fig. 1) indicates the bed of a camera open in position for picture taking.

The battery and magazine bulb socket unit 10 is mounted detachably on the bed of the camera by means presently to be described, while the actuating means 11, including the cable release 12, is inserted into the standard shutter socket 13 usually provided on cameras for receiving the cable release.

The actuating container cylinder 14 (see Fig. 2) is constructed of any suitable material and comprises a central tubular section to the ends of which are detachably connected, preferably by screw threads, the heads 14a, 14b.

Each of the heads 14a, 14b is of similar construction and is provided with an interiorly screw threaded socket on its outer end 14c and with an annular inwardly projecting flange or shoulder 14d against which the ends of the central tubular section are adapted to abut. Screwed into the socket 14c of the head 14b is a plug 15 having a projecting nipple portion 16 provided with the standard screw thread for fitting into the socket provided on cameras for the receptacle of shutter actuating cables. The socket 14c of the head 14a has screwed into it a screw threaded washer 17 provided at its central portion with a screw threaded aperture 18 for the reception of the screw threaded end of the cable release 19; a washer 20 is preferably interposed in each head between the flange 14d and the plug 15 and washer 17 respectively.

Slidably mounted within the cylinder 14 is a piston 21. Screwed into one end of said piston is a shutter operating plunger 22 which at one end extends through and is slidably mounted within a central aperture 23 of the plug 15. The piston 21 is normally urged by a coil spring 24 towards the left hand end (Fig. 3) of the cylinder, said spring abutting at one end against the piston 21 and at the other end against the washer 20 located in the head 14b. The piston 21 has a longitudinal groove 25 cut in its periphery into which groove extends a spring contact and electric conducting member 26. This member (as shown in Fig. 3) is bent to extend at one end outwardly through the walls of the cylinder 14 and head 14a and thence to extend along the outer wall of the head 14a in contacting engagement therewith, to which it is secured by brazing, soldering or in any other suitable manner, as indicated by the numeral 27; this end of the contact member being bent backwardly upon itself to form a spring clip 28 for the terminal of an electric wire 29. The other end of the member 26 is also bent to extend through an aperture 30 formed in the side wall of the cylinder 14 and is bent back upon itself as indicated by the reference character 31 to form a stop which limits the movement of the spring contact 26 inwardly of the cylinder.

The cable release 19 is provided with the usual plunger 32 which when actuated by the push-pin 33 engages the end of the piston 21 and causes the same to move towards the right against the spring 24. As the piston 21 moves toward the right it will, as will be apparent, cause the spring contact 26 to be pushed outwardly from the full line position shown in Fig. 8 to the dotted line position, as to contact with a co-operating spring contact member 34. The latter is also secured to the head 14b in a manner similar to that of the member 26 and is bent at its end to form a spring clip 35 for the receptacle of the terminal of the conducting wire 36.

Screwed into the walls of the head 14b and cylinder 14 is a stud 37 which projects through the spring contact 34. Mounted between the interior face of the spring contact 34 and the periphery of the head 14b is a coil spring 38 which serves to normally force the free end of the spring contact member 34 away from the wall of the cylinder 14. An adjusting thumb screw 39 is screwed onto the stud 37 for the purpose of adjusting the position of the spring contact member 34 relatively to the end 31 of the spring contact member 26 for a purpose which will presently be fully described.

Figure 6:
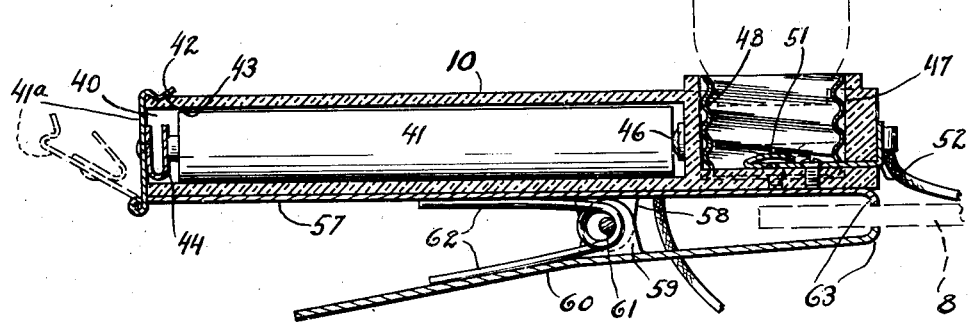
Fig. 6 is a longitudinal sectional view taken on the line 6—6 of Fig. 5.
Figure 7:
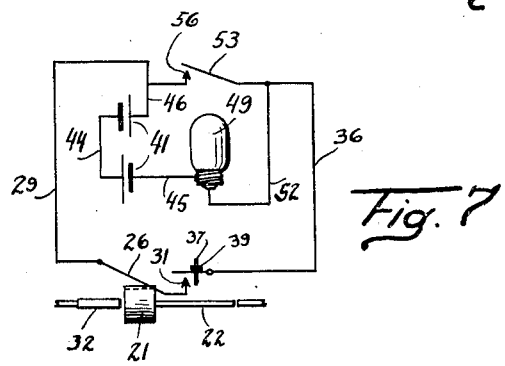
Fig. 7 shows the plan of the electric circuit used to operate my device.

The battery magazine and socket unit shown in Figs. 5 and 6 is preferably formed as a shallow rectangular member formed to provide a compartment 40 for the reception of a pair of batteries 41, the end of said compartment being closed by a small hinged cover 41a having a spring catch 42 for engagement with a notch 43 formed in the outer wall of the unit 10. The cover plate 41a has secured to its inner end a spring 44 which is shown as of U-shaped cross-section, but which may be of any suitable construction designed to hold the batteries in engagement with the conductors 45, 46 located at the inner end of the compartment 40. The spring 44 as shown in Fig. 5 also serves as a conductor to connect the batteries 41 in series.

The unit 10 is also formed to provide a receptacle 47 for a screw threaded socket 48 into which a photo-flash bulb 49 is adapted to be screwed. The socket 48, in accordance with the usual construction of such devices, is of conducting material and has secured in conducting relationship with it as by means of the screw 50 the end of the conductor 45. Located centrally of the socket 48 at the base thereof, also in accordance with the usual construction, is a spring end 51 of a conductor 52 which extends outwardly through the wall of the receptacle 47 and is bent to extend along the exterior of the said wall and thence around the corner of said receptacle to terminate in a spring contact 53. Secured in conducting relationship with the contact 52 by any suitable means such as the screw 54, is a spring clip 55 adapted to receive the other end of the conducting wire 36. The conductor 46 hereinbefore referred to, also extends outwardly through a wall of the unit 10 and terminates adjacent to the free end of the spring contact 53. The conductor 46 has suitably secured to it in conducting relationship a spring clip 56 which serves to receive the other end of the conducting wire 29.

Secured in any suitable manner to the base of the unit 10 is a plate 57 which forms one member of a strong spring clip. The plate 57 is formed with a pair of depending ears 58 adapted to co-operate with a similar pair of ears 59 of the other member 60 of the spring clip, a pivot pin 61 passing through the ears 58, 59 in accordance with the usual construction of devices of this character; a spring 62 serves to normally urge the grip ends 63 of the spring clip towards each other.

The manner in which the device operates is as follows:

If it is desired to actuate the flash device in synchronism with the camera shutter by the usual cable release, the cylinder 14 and attached parts is connected to the camera, the screw threaded nipple 16 being screwed into the socket with which the camera is provided for this purpose. The battery magazine and socket unit 10 is clamped onto the bed of the camera by the spring clip 57, 60 in a manner that will be readily understood. The photographer will ordinarily place a small electric bulb of low candle power in the socket 48 and will focus the camera in the usual manner. In focusing the camera the adjusting thumb nut 39 will be adjusted until exact synchronization is secured between the opening of the shutter and the lighting of the bulb When the photographer presses the push-pin 33 of the cable release the piston 21 will be actuated by the plunger 22 inwardly of the cylinder 14 as hereinbefore described. This movement of the piston 21 will cause the spring contact 26 to be pushed outwardly until contact is established between the hook end 31 thereof and the spring contact 34. When this occurs the circuit from the batteries 41 is completed, such circuit being established through conductor 46, lead wire 29, contact 26, contact 34, lead wire 36, conductor 52, bulb 49, socket 48 and conductor 45. As the piston 21 moves inwardly the plunger 22 connected to the end thereof is projected through the nipple 16 to actuate the camera shutter. If the photographer finds that the bulb lights before the shutter opens the thumb screw 39 is screwed outwardly until exact synchronization is secured. As will be understood, if the lighting of the bulb is too late the thumb screw is screwed inwardly towards the cylinder 14. The stud 37 is provided with a screw of very fine pitch so that exact synchronization can be secured for the fastest shutters. After the camera has been focused properly and proper adjustment has been made for synchronization, the bulb of low light intensity is removed and a photoflash bulb is substituted. As these bulbs are instantaneous in their operation and as the electric circuit is immediately established through the circuit as described above, the ignition of the flash bulb will take place without any lag or time interval such as characterizes the devices heretofore proposed for electric flash lights.

When it is desired to use the device not in connection with the cable release, but merely as a separate hand operated attachment the circuit to the bulb can be closed by depressing the spring contact 53 against the screw 56a, the circuit being from conductor 46, screw 56a, spring contact end 53 of the conductor 52, thence to the bulb socket 48 and conductor 45.

The circuits in both cases above described are in series through the batteries through the spring clip conductor 44.

As will be seen from the above description, a device manufactured in accordance with the principles of this invention is of very small compact and sturdy construction, it occupies but very little space and can be readily carried in a photographer's pocket. The parts are relatively simple in construction so that the device may be manufactured and sold at a relatively low price. There are no fragile moveable parts to get out of order. The connecting of the units to the camera for synchronized operation of bulb and shutter is a simple process requiring but an instant's time. The synchronization adjustment is remarkably easy and simple requiring no special knowledge of either electricity or photography. The use of the batteries of the type shown renders it unnecessary to exercise any care with respect to the manner in which the conducting wires 29, 36 are connected to their respective spring clips, as a reversal of the ends of the wires 29, 36 would not in any way change the functioning of the apparatus. The insertion of new batteries when necessary is simple and readily accomplished by swinging the cover plate 41a upon its hinge as will be readily understood, and when new batteries have been installed and the cover plate snapped back to its closed position, the connection of the batteries 41 in series is automatically accomplished. It will be understood that while I have disclosed a satisfactory constructional example that many changes, variations and modifications of the specific details of the example selected for illustration may be resorted to without departing from the spirit of the invention.

I claim:

1. In a flashlight device for photography, an electric light bulb socket adapted to receive a photo-flash bulb, means for securing said socket detachably to a camera, a combined switch and camera shutter release adapted to be secured to the socket provided on a camera for a cable release; said combined switch and cable release having means for securing a cable release thereto, a spring pressed piston actuatable by said cable release, and a spring contact for said switch actuatable by said piston.

2. In a flashlight device for photography, a cylinder having a screw threaded end adapted to be attached to the cable release socket of a camera, means for securing to the other end of said cylinder a cable release, a spring pressed piston slideably mounted in said cylinder for actuation by said cable release, a combined switch contact and conducting member actuated by said piston and an adjustable spring contact co-operating with said first named spring contact.

3. In a flashlight device for photography, an electric light bulb socket, means for securing said socket detachably to a camera, an electric switch having means for connecting the same between a cable release and the cable release socket of a camera, said switch including means for actuation by the plunger of a cable release, a camera shutter actuating plunger associated with such switch, and adjusting means for synchronizing the closing of said switch and the actuation of such shutter.

4. In a flashlight device for photography, a cylinder having a screw threaded end adapted to be attached to the cable release socket of a camera, means for securing to the other end of said cylinder a cable release, a switch carried by the cylinder, a spring pressed plunger for operating said switch slideably mounted in said cylinder for actuation by said cable, and adjusting means for synchronizing the closing of said switch and the actuation of such shutter.

5. In a flashlight device for photography, a unit comprising a photo-flash bulb and a dry cell compartment having a battery therein, conducting members between said battery and bulb, including a manually operable switch, and means for connecting the ends of terminal wires in shunt with the manually operable switch, and a cable release-operated switch connected with said terminal wires, said cable release-operating switch being provided with means for securing it to the cable release receiving socket of a camera, to enable automatic energization of the bulb concurrently with operation of the cable release.

6. In a flashlight device for photography, a unit comprising a photo-flash bulb and a dry cell compartment having a dry cell therein, conducting members between said dry cell and bulb, including a normally open manually operable switch for selectively connecting the cell and bulb, means for connecting the ends of terminal wires to said conducting members in shunt with the manually operable switch, and a cable release-operated switch connected with said terminal wires enabling automatic energization of the bulb concurrently with operation of the cable release.

7. In a flashlight device for photography, a unit comprising a photo-flash bulb and a dry cell compartment having a dry cell therein, conducting members between said battery and bulb, including a manually operable switch, means for connecting the ends of terminal wires to said conducting members in shunt with the manually operable switch, a cable release-operated switch connected with said terminal wires, said cable release-operating switch being provided with means for securing it to the cable release receiving socket of the camera and including means for actuating the shutter of a camera, and adjusting means between said shutter operating means and switch for securing synchronization between the operation of said shutter and the closing of said switch.

In testimony whereof I affix my signature hereto.

MONROE D. B. STROECKER.